Oct. 8, 1946.    E. M. McELHINNEY ET AL    2,409,143
LOADER
Filed May 14, 1942    3 Sheets-Sheet 3

Fig.3.

Inventors,
Eric M. McElhinney,
& James A. Podhajsky.
By J.E.Kennedy. Attorney

Patented Oct. 8, 1946

2,409,143

UNITED STATES PATENT OFFICE 2,409,143

LOADER

Eric M. McElhinney and James A. Podhajsky,
Tama County, Iowa

Application May 14, 1942, Serial No. 442,902

19 Claims. (Cl. 198—13)

The present invention relates in general to hoisting machinery or loaders, especially of the elevating-conveyer type, and it has more particular relation to such apparatus as is adapted to be readily transported or moved along the ground and to lift material from the ground and convey it to a receptacle or point of deposit at a desired level. Apparatus of this character is of particular utility in loading material, in baled form, from the ground to a suitable elevated point of discharge or deposit, such as a wagon or truck.

Where harvested hay or the like is left in the field, subsequent loading of such material by hand, from the ground to a wagon or truck, ordinarily involves considerable time and arduous work, and corresponding incidental expense. The present invention contemplates and has for an object the provision of apparatus of improved design and relatively simple construction and capable of eliminating the arduous labor involved in manual loading of material to a wagon or other elevated point of deposit and of greatly speeding up the work of loading the material, through the use of an elevating-conveying device which is readily capable of being propelled, along with the wagon, by a power driven vehicle, such as a tractor, which may supply the necessary power for operating the lifting and conveying device.

It is a further object of this invention to provide an improved design and construction of such elevating-conveying apparatus adapted to be adjustably mounted, for movement in a vertical plane on a wheeled carrier and having improved facilities at its forward end for facilitating the directing and lifting of material from the ground onto the conveying device.

It is a further object of this invention to provide an improved design and construction of such elevating-conveying apparatus wherein side portions of the apparatus flare outwardly at the forward end and are provided with rockable devices, of particular utility in operating on baled material, for facilitating the lifting of material from the ground and its transfer, in desired position, onto the traveling conveying mechanism of the apparatus.

It is a further object of this invention to provide an improved design and construction of elevating-conveying apparatus attachable, preferably in a readily detachable manner, and preferably adjustable with respect to, a wheeled propelling power vehicle, such as a tractor, and with a readily detachable power driving connection from the propelling vehicle to the elevating-conveying apparatus, and with the latter so related to the power vehicle that the operator thereof may readily control, from his normal position while driving the vehicle, the operation and adjustment of the elevating-conveying apparatus.

It is a further object of this invention to provide such an elevating-conveying apparatus wherein a rear section of the elevating-conveyer is adjustably mounted in position with respect to the forward section thereof and adjustably suspended from the support for the forward section of the conveyer.

The above and other objects and advantages are attained by the present invention, various novel features of which will be apparent from the description herein and the accompanying drawings, disclosing embodiments of features of the invention, and will be more particularly pointed out in the annexed claims.

In the embodiment of the invention illustrated in the drawings, a hoisting-conveying apparatus, of a type particularly adapted for lifting baled material from the ground to an elevated point of deposit, is shown as mounted on a conventional form of tractor 1 having a rear axle housing 2 carrying the rear traction wheels 2a, and provided with a pair of front steering wheels 2b suitably mounted on the forward end portion of the tractor frame. The hoisting-conveying apparatus includes a supporting structure detachably and adjustably mounted on the tractor to permit movement of the apparatus in a vertical plane.

The supporting structure of the elevating-conveying apparatus includes spaced apart side frame elements each comprising a set of longitudinally extending and spaced frame bars 3a, 3b, 3c, the several frame bars of each set being held in position by suitably formed brace bars or straps 4 which also serve to position the upper frame bars 3a laterally outside of the frame bars 3b and 3c. A bottom or apron 5 closes the space between the two sides frames, the apron being preferably attached at the lower edge of the intermediate side frame bars 3b, and serving in conjunction therewith and with one or more transverse brace bars 6 to provide a rigid supporting structure or basal support for the elevating-conveying mechanism.

The elevating-conveying mechanism includes endless conveyer chains 13 mounted at opposite sides of the supporting structure, the chains being connected in conventional manner through cross-bars 14, and the chains of the assembled endless conveying mechanism being operatively associated with driving sprockets on a shaft 15 rotatably mounted in suitable bearings on the rear end portion of the supporting structure, and with guide sprockets mounted on end journal portions of a roller shaft 16 at the forward end of the supporting structure, these latter journal portions being rotatably mounted in bearings, preferably adjustable in a conventional manner to permit desired tensioning of the chains, in a forward and outward extension, integral with or otherwise rigidly secured, of bracing plates 17 secured to the forward portion of the longitudinal frame bars at each side of the structure. In normal operation, the upper course of the conveyer chains and the connecting cross-bars ride over the upper surface of the apron or plate 5, and the lower course travels forwardly beneath such apron. The intermediate portion of the roller shaft 16 may be provided with one or more supporting or riding rings 16a on which the cross bars may ride as they reverse their direction of travel at the forward lower end of the supporting structure. The cross-bars 14 are preferably provided with pointed studs or the like 14a effective to bite into baled material or the like being elevated and to securely hold such material in position with respect to the traveling conveying chain element as the latter is moved upwardly along the apron 5.

The front end of the forward extension of each of the bracing plates 17 is provided with an outwardly offset portion 17a integral with or otherwise rigidly secured to such forward extension of the bracing plate, this offset portion serving as a support for, or to assist in bracing, gathering devices, one at each side of the supporting structure, of special utility in lifting from the ground baled material, such as baled hay or straw, resting in various positions in the general path of travel of the tractor and elevating-conveyer assembly. The lower edge of the forward portion of each of the bracing plates 17 has mounted thereon, integral or otherwise rigidly secured thereto, sliding elements or shoes 17b adapted to rest relatively lightly on and slide along the ground as the tractor, with the elevating-conveying apparatus operatively mounted thereon, travels along.

The particular form of gathering devices here disclosed includes a gathering arm 18 at each side of the supporting structure and each comprising upper and lower plates or bars 18a, 18b, respectively, secured to or braced by the bracing plate 17 and its forward extension 17a, and substantially spaced apart and extending forwardly, with a laterally outward offset, and connected, preferably integrally, at their forward ends by a cross piece 18c extending in a generally vertical direction; and a bar 18d disposed intermediate the bars 18a and 18b and lying substantially in the common plane of the latter bars is secured, as by welding, at its forward end to the cross piece 18c, and its rear end is mounted in a manner generally similar to the mounting of the bars 18a and 18b. One or more of the bars 18a, 18b, 18d may be in the form of an integral and suitably offset forward portion of the corresponding longitudinal frame bars 3a, 3b, 3c, respectively, such extensions being suitably secured to or braced by the bracing plate 17 and the offset extension 17a thereof. The two gathering arms are so shaped and mounted in position that the lower bars 18b thereof lie appreciably above the ground level when the sliding shoes 17b are resting on the ground. To assist in holding and bracing each of the gathering arms in desired position, particularly against strains tending to laterally outwardly displace the forward end portions of the gathering arms, a bracing rod 18e is provided, this rod being secured, as by welding, at its forward end to the vertical cross piece 18c or the forward end of the intermediate bar 18d, and at its rear end being secured to a lateral extension of the bracing plate 17 or a lateral extension of the forward cross-bracing rod 6.

Pivotally mounted on the forward cross piece or bar 18c of each gathering arm, so as to rock on a generally vertical axis, is a double prong element 19, including two substantially forwardly extending, parallel and similar prongs 19a having relatively sharp points, and a substantially vertically extending cross piece 19b connecting the prongs 19a at their rear ends. The cross piece 19b of the double prong element 19 is pivotally mounted in position by means of a pair of spaced eye-bolts 20, the cross piece 19b passing through the eye portions, at the forward side of the cross piece or bar 18c, and the shank portions of the bolts passing through and being suitably secured in position, preferably in a detachable manner, in apertures in the latter cross piece.

Each double prong element 19 is biased in an outward direction about its pivotal axis by a tension spring 21, secured at its rear end to an intermediate portion of the bracing rod 18e and at its forward end to a block or plate extension 22 secured, preferably by welding, to the cross piece 19b of the prong element. The rear end of this attachment plate 22 extends rearwardly over the outer face of the vertical cross piece 18c at the forward end of the gathering arm. The point of attachment of the spring to the plate 22 and its position with respect to the actual pivotal axis of the prong element 19 are such that, with a suitable degree of tension of the spring 21, the latter biases the pivoted prong element to its laterally outward position, wherein the attachment plate 22 is in engagement with the cross piece 18c of the gathering arm; but the prong element is capable of being moved laterally inward, against the normal biasing action of the spring, in response to application of suitable turning moment to the prong element, such as occurs during normal operation of the elevating-conveying apparatus in the handling of baled material.

The elevating-conveying apparatus is pivotally supported, at a point toward its rear end, from the tractor, as will be referred to hereinafter. And a considerable portion of the weight of the forward end of the elevating-conveying apparatus is counterbalanced, with the object that such forward portion may be more readily lifted by the operator and also that the sliding shoes 17b may rest more lightly on, and slide more readily along, the ground, through a tension spring 23 secured at its upper end, through an eye bolt 23a, to an overhanging supporting plate 23b suitably mounted, preferably through detachable bolts 23c, on a forward end portion of the tractor frame, and the lower end of the spring 23 is attached, through a rod or section of chain 24, to the laterally inner one of a pair of spaced lever arms 25. These lever arms 25 are provided at their rear ends with a common bearing element 25a, in the form of a tubular portion serving as a bearing sleeve, rotatably mounted on a journal portion of a supporting shaft or rod 26 which extends laterally from the tractor frame and beneath the supporting structure of the elevating-conveying apparatus. This supporting rod 26 is rigidly mounted in position by means of one or more brackets 27, preferably made up of one or more arms welded at the lower end to the rod 26 and suitably, and preferably detachably secured at the upper end to the adjacent lower portion of the tractor frame. For purposes of additional security of mounting of the supporting bar or shaft 26 in position, the latter preferably extends laterally beneath the tractor frame to the opposite side thereof, with an additional supporting bracket, similar to the bracket 27, for holding the adjacent end of the bar in position with respect to the tractor frame.

The two lever arms 25 are so spaced, and the connecting bearing sleeve 25a is of such length and so positioned on the rod 26, that the lever arms are adjacent but laterally beyond the longitudinal side frame elements of the supporting structure. And the lever arms 25, with the common bearing sleeve 25a, constituting a portion of a linkage connection between the shaft or rod 26 and the side frames of the supporting structure, this linkage connection being completed by a link 25b pivotally connected at its lower end to the forward and normally lower end of each lever arm 25. The upper end of each link 25b is pivotally connected, through a bolt passing through a selected one of a plurality of apertures in the link, to an anchor bar or strap 4a suitably secured to one or more of the longitudinal side frame bars 3a, 3b, 3c of the supporting structure.

The lower end portion of an operating lever 28 is secured, as by welding, to the rear end of the inner lever arm 25, or the bearing sleeve 25a thereon; however, if desired, a duplicate operating lever, similar to the lever 28, may be associated with the outer one of the lever arms 25. On clockwise adjustment of the operating lever 28 from full line position shown in Fig. 2, wherein the sliding shoes 17b of the elevating-conveying apparatus rest normally on the ground, the operating force being applied directly to the lever 28 or indirectly, through a chain 29 connected to the lever 28 and suitably actuated as hereinafter described, the lever arm 25 is rotated clockwise on the shaft or rod 26 and the link 25b is moved upwardly and, through its connection to the supporting structure of the elevating-conveying apparatus, through the anchor plates 4a, the forward portion of the apparatus is moved upwardly to raise it to any desired degree from the ground, the necessary force required to effect this raising action being reduced by reason of the spring 23 being normally under tension and thus counterbalancing a portion of the weight of the apparatus. The rear end of the chain 29 may be connected to a second lever, pivotally mounted on the tractor, in a position where it may be readily actuated from the operator's seat on the tractor. The upper limiting position of the elevating-conveying apparatus is indicated in dotted outline in Fig. 2. With the parts in this latter position, each linkage, made up of a lever arm 25 and a link 25b, is in substantially straightened condition; and an abutment lug 25c on and projecting past the inner face of the lower end portion of link 25b prevents the linkage from moving past neutral condition of the toggle.

To provide for the required support of the elevating-conveying apparatus and its above described pivotal movement about a fixed axis, a pair of upwardly extending standards 31, one at each side, are rigidly secured, in a detachable manner, at the lower end to the rear side of the rear axle housing 2 of the tractor, as indicated at 31a. The upper ends of the standards 31 lie laterally outside of the side walls or bars 3a, 3b, 3c of the supporting structure and are preferably cross-braced through one or more rigid cross pieces at suitable points below the body structure of the elevating-conveying apparatus. At the upper ends of the standards 31, as by being rigidly mounted on the rear face of each of these upper end portions, are aligned bearings 32 which may be open at the upper side to receive pivotal supporting portions, such as end portions of the rear sprocket driving shaft 15, these pivotal portions being rotatably supported in the bearings 32 and at the same time transmitting to the supporting standards 31 the weight of the elevating-conveying apparatus. Through this arrangement, the forward portion of the apparatus may be lifted upwardly about the axis of the shaft 15, as a pivotal axis.

The supporting standards 31 may be further suitably braced in position by one or more brace rods secured, at a suitable point, to upper portions of the standards, or to a cross-bracing piece associated therewith, and secured at their lower ends to the forward side of the rear axle housing. Or use may be made merely of the form of bracing shown in the drawings, an arrangement which is of special utility where the elevating-conveying apparatus is provided with a rear adjustable discharge portion, as more particularly illustrated in Fig. 3. In this arrangement, generally upright supporting standards 34 are provided, one at each side of the apparatus, the upper end portions of these standards being turned in toward each other and being connected by a cross-bracing bar 35 having extending end portions, and the lower ends of these standards being provided with feet 34a lying laterally outside of the supporting structure of the elevating-conveying apparatus, and seating fully on corresponding seat portions formed on the upper ends of the lower supporting standards 31. The engaging feet portions of the standards 31 and 34 are secured together, as by bolts 36.

Upper plate extensions 37 are secured as by welding, to the upper part of the vertical portion of the supporting standards 34, and preferably are also secured, as by welding, to the laterally extending ends of the cross-bar 35. The upper standards 34 and, through their connection to the lower standards 31, the latter are further braced in position by bracing rods 38 secured at their upper ends, through extensions 38a, to the plate extensions 37, the lower ends of the bracing rods lying laterally outside of the longitudinal frame bars 3a, 3b, 3c of the supporting structure and being connected, through a connection 38b, to brackets 38c secured to the forward side of the rear axle housing 2.

Power for operating the chain conveying mechanism of the elevating-conveying apparatus may be supplied through a V-belt driving connection from a sheave on a power take-off shaft 39 on the tractor, directly or if preferred indirectly, through a suitably disposed driven sheave 40 to a sheave (not shown) mounted on a laterally inward extension of the shaft 15 carrying the driving sprockets of the conveying chains, the position of the axis of this latter shaft remaining fixed relatively to the axis of the driving shaft 39 on the tractor.

Figures 1, 1A:
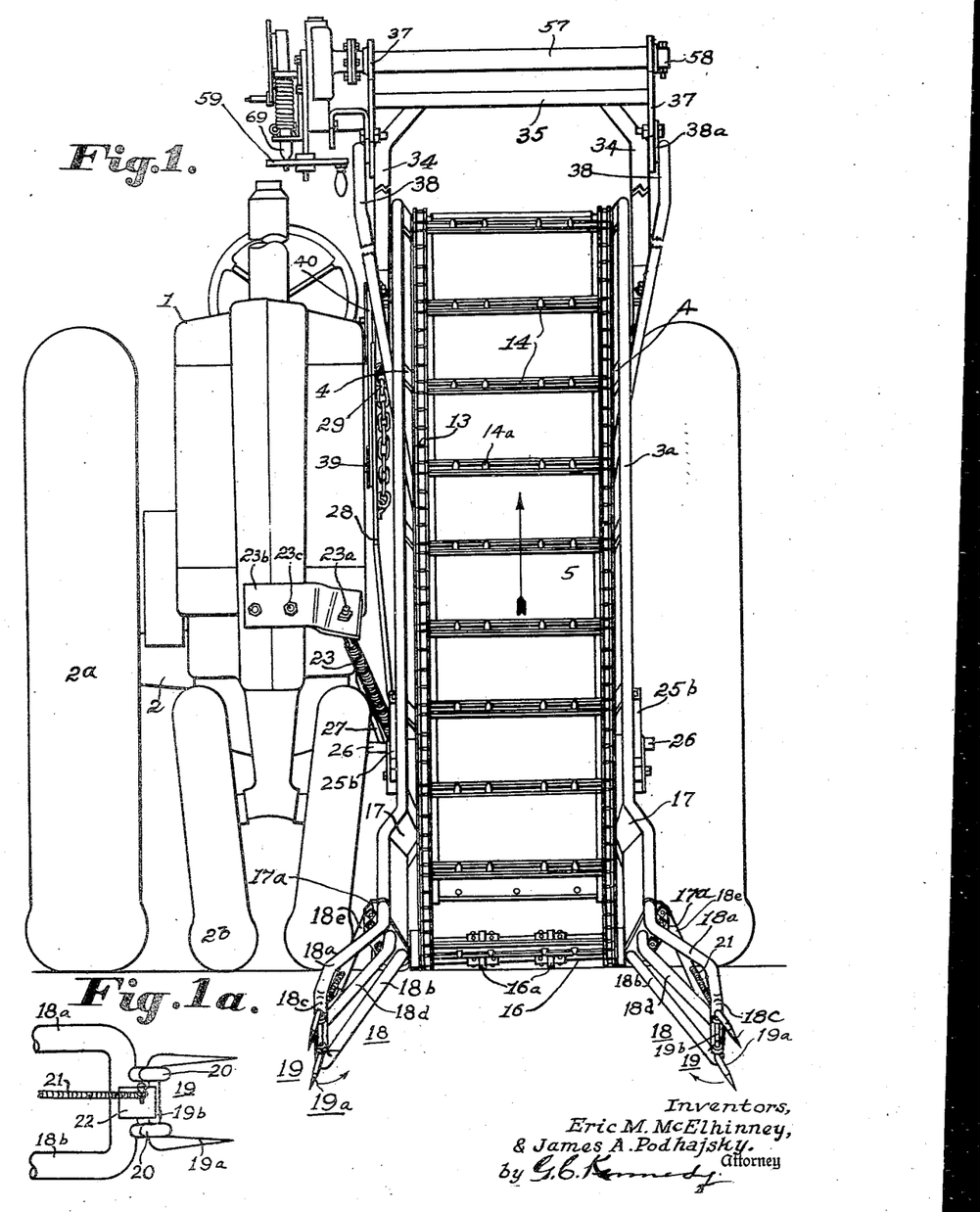
Fig. 1 is a front elevation of apparatus embodying the present invention, showing a hoisting device of the elevating-conveying type mounted on a tractor.
Fig. 1a is an enlarged fragmental view, in side elevation, showing a portion of the gathering device at the forward end of the apparatus of Fig. 1.
Figure 2:
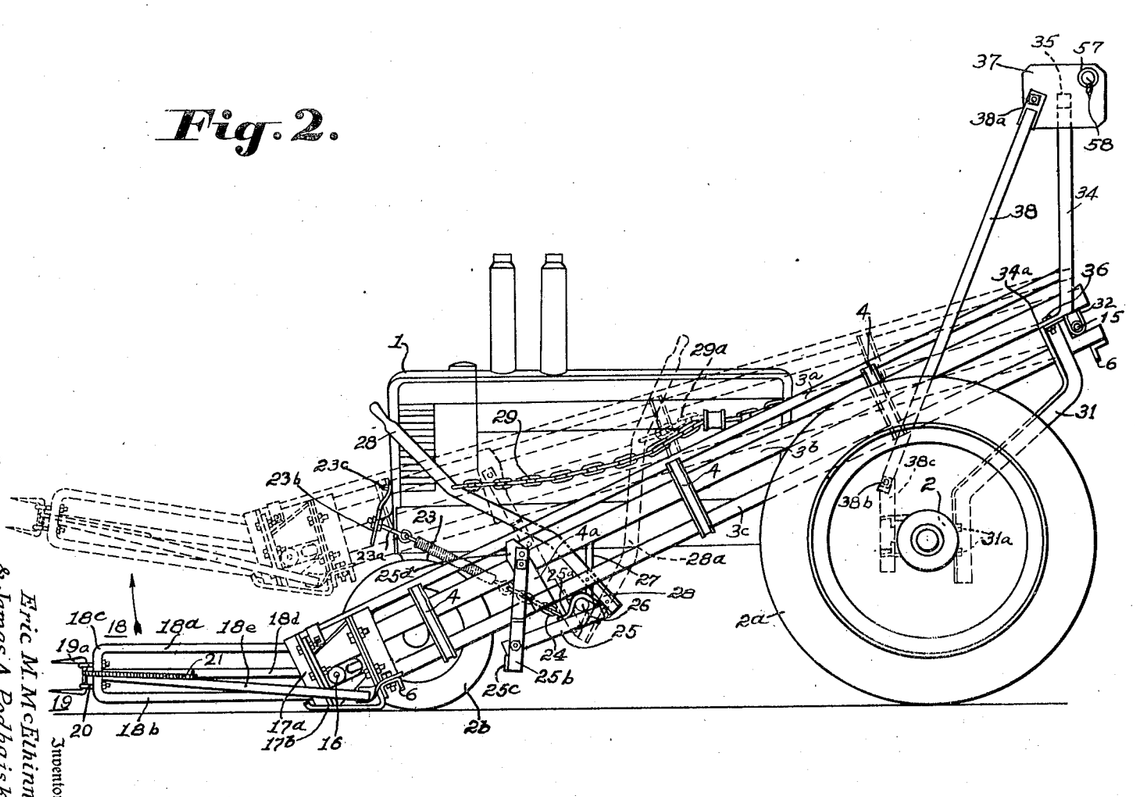
Fig. 2 is a side elevation of the apparatus shown in Fig. 1.
Figure 3:
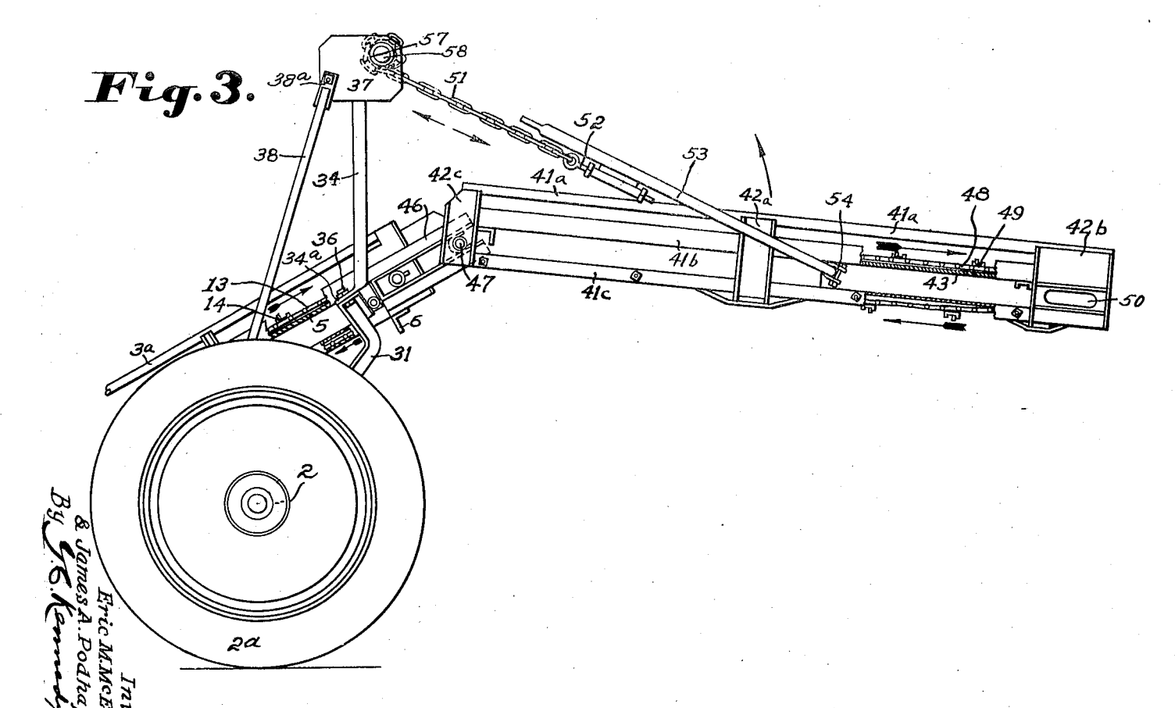
Fig. 3 is a fragmental side elevation of the rear portion of a modified form of the apparatus shown in Figs. 1 and 2.

In Fig. 3, the elevating-conveying apparatus of Figs. 1 and 2 is shown as provided with a rear discharge section pivotally connected to the main or forward section of the appaartus, and adjustable up and down with respect to the forward section to a desired extent to vary the level of the final discharge of material from the apparatus. As indicated, this adjustable rear section may be made up of a pair of laterally spaced sets of longitudinal side frame arms 41a, 41b, 41c secured in desired relative position by bracing bars 42a, 42b, 42c, with a floor plate or apron 43 secured in position with respect to the side frame bars, generally as indicated in connection with the heretofore described apron 5 of the forward section of the apparatus.

Where the rear adjustable section of the apparatus is not contemplated to carry a separate traveling conveyer chain, such latter provision being more particularly desirable where the rear section is intended at times to convey material upwardly from the horizontal, the rear section may be pivotally connected directly to the end of the main or forward section shown in Fig. 1, even to the extent of utilizing the axis of the rear sprocket shaft 15 as the pivotal axis about which the rear section may be adjusted in position. Where, as indicated in Fig. 3, the rear section carries a separate chain conveying mechanism, it is preferable, in order to provide for appreciable spacing between the rear chain sprockets of the forward section and front chain sprockets of the rear section, to provide a rear extension, indicated at 46, of the frame of the forward section, the forward edge of the rear section being pivotally connected to this extension, preferably on the axis of a shaft, as indicated at 47, on which the front driving sprockets of the conveying chains 48 are mounted. These chains are connected by cross-bars 49 in a manner similar to the corresponding chains of the forward section. The rear sprockets for the conveying chains 48 are mounted on a shaft carried in bearings mounted in elongated openings 50 in the rear bracing plates or bars 42b to permit desired adjustment of the tension of the chains.

The rear section of the elevating-conveying mechanism may be adjusted to and held in desired position through chains 51 adjustably connected, through an adjustable eye-bolt connection 52, to connecting rods 53 suitably pivotally attached, as indicated at 54, to an intermediate portion of the side frame bars of the rear section, the forward ends of the chains 51 being secured to and wound to an appropriate extent on a hollow shaft or drum 57 rotatably supported in position in bearing apertures in the plate extensions 37 mounted on the supporting standards 34. Suitable provisions may be made for winding the hollow shaft or drum 57 to the extent required to place the rear section of the conveying apparatus in desired position relative to the forward section; and such provisions may include a shaft 58 rotatably mounted within the hollow shaft 57, and a driving connection from a suitably supported manually operable crank 59 to an extending portion of the inner shaft 58, and a driving connection from the inner shaft to the hollow outer shaft or drum 57. When the drum 57 has been rotated to the required extent to adjust the rear section of the conveying apparatus to desired operative position relative to the forward section, a suitably supported spring pressed latch 69 may be permitted to engage in a suitable depression in the operating crank 59 to hold the latter and associated parts in adjusted position.

Where the adjustable rear section is not used as a part of the elevating-conveying apparatus, the rotatable hollow drum 57 may be utilized for actuating the operating lever or levers 28, which serve to adjust the forward section of the apparatus, through the operating chain 29, or a chain or rope connection therefrom, the end of such chain extension being secured to and wound about the drum 57 to the desired extent, through operation of the hand crank 59, as hereinabove described. And in the event that it should be desirable to provide for common or simultaneous adjustment of the forward section of the apparatus about its stationary pivotal axis and of the rear section about its pivotal support, this may be accomplished by connecting the chain or chains 29, or flexible extensions therefrom, as well as the adjusting chains 51 of the rear section, to the rotatable drum 57, so that a desired operation of both the forward or main section and the rear section may be secured simultaneously through the hand crank 59.

The width of the elevating-conveying mechanism between the laterally spaced side walls or frames, made up of the longitudinal side frame bars 3a, 3b, 3c, is such that ordinary bales of rectangular or circular cross-section may be readily received between the side frames when such bales are disposed lengthwise on the conveying mechanism, and it is desirable that the bales be lifted onto and conveyed along the apparatus with their axes lying in a fore and aft direction on the conveying mechanism.

The elevating-conveying apparatus is capable of being readily assembled in operative position on and removed from the tractor, as will be apparent from the description hereinabove, and the design of the apparatus and the means for operatively mounting it on the tractor are such as cause no interference with the operation or control of the tractor.

With the elevating-conveying apparatus mounted on a tractor or other power vehicle and the latter drawing a trailing wagon in position rearwardly and adjacent the discharge end of the apparatus, then, with the main section of the apparatus in lowered position, as indicated in Fig. 2, as the tractor and elevating-conveying apparatus travel through a field, the elevating-conveyer is advanced against the material to be loaded. Where such material is in loose form, as in the case of hay in a windrow, the material is lifted by the cross-bars 14 on the endless conveying chains 13, at the forward end of the apparatus and thrown onto the traveling cross-bars and the apron; and the material is lifted by the rearwardly traveling chain conveying mechanism, the prongs or studs 14a on the cross-bars assisting in grasping and lifting the material onto the conveying mechanism and retaining it in position thereon during its upward travel.

The forward, outwardly flaring gathering arms 18 serve to gather the side portions of the windrow or the like and shift it to a position at the forward edge of the chain conveying mechanism where it can be readily lifted onto the upper course of such mechanism. Any material in the path of the spring-biased prong elements 19 is engaged by the latter and turned inwardly as the apparatus advances, the prongs rocking inwardly to the required extent to permit their disengagement from the material as the apparatus advances with respect to the material being gathered. On reaching the upper rear end of the apparatus, the conveyed material is discharged rearwardly onto the trailing wagon, such discharge being either direct, where the adjustable rear section of the apparatus is not present, or where such rear section is present, as indicated in Fig. 3, the discharge being onto such rear section, the material being carried along the latter section to the discharge end thereof whence it is discharged to the trailing wagon.

Where the hay or the like has been baled and the bales remain in the field, the bales are likely to lie in fairly straight rows, determined by the path of the baling machine through the field; but the individual bales are likely to be disposed with their longitudinal axes at various angles to the general direction of the row of bales and the travel of the apparatus. As the tractor and elevating-conveyer assembly travels through the field along a row of bales to load the latter, the spring-biased prong elements 19 at the forward end of the gathering arms 18 have a special utility in facilitating the positioning and loading of the bales onto the conveying mechanism. Where a bale lies on the ground with its axis in a substantial fore and aft direction, only the body portion of the gathering arms 18 is likely to contact the bale, to longitudinally align the bale with the conveying mechanism, to facilitate the action of the cross-bars 14, with their gripping studs 14a, in grasping the underside of the rear edge of the bale, dragging and lifting the latter fully onto the chain conveyer as the apparatus continues to move forwardly. The weight of the bale forces it onto the prongs of the studs 14a of the cross-bars 14, thus insuring that the bale remains in desired position on the conveying mechanism during upward travel of the bale toward the discharge edge, the bale passing beneath the crossbrace 35 and drum 57, whence it is discharged directly, as indicated in Figs. 1 and 2, or indirectly by way of the rear adjustable conveying section, as indicated in Fig. 3, to the trailing wagon.

Where the bale, in the path of travel of the elevating-conveying apparatus, lies with its longitudinal axis at a substantial angle to the direction of travel of the apparatus, then the tractor and loader assembly approaches the bale to cause the prong element 19 on one or the other of the gathering arms 18 to first contact the bale at a point laterally beyond the central vertical plane transverse to the axis of the bale, the sharpened prongs 19a being forced into the body of the bale. Through this effect, as the apparatus advances, the other end of the bale is swung inwardly, being shifted along the ground toward a position wherein the axis of the bale approaches the fore and aft direction in which the apparatus is traveling. During this shifting of the bale, the prongs 19a are embedded in the bale, and as this end portion of the bale is swung inwardly during the continuous advance of the apparatus, the prongs rock on their pivotal connection at the forward end of the gathering arm, against the tension of the spring 21, the prongs being automatically released from the bale as that portion of the bale with which the prongs engage pass rearwardly beyond the forward edge of the gathering arm, and the spring 21 returning the prong element to its normal forwardly directed position as the prongs are fully released from the bale. This penetration of the bale by the prongs 19a is particularly advantageous in the gathering of cylindrical bales lying on the ground, since the penetrating prongs hold the bale against rotating while it is being shifted to the desired position wherein its longitudinal axis lies in the direction of travel of the apparatus. As the conveying apparatus moves forwardly, the cross-bars 14 of the conveying chain engage the underneath side of the rear edge of the bale, lifting the same and drawing it onto the conveying mechanism, for rearward and upward travel therealong and discharge therefrom.

Through this spring mounting of the forwardly directed manipulating prong elements 19, at the forward edge of the gathering arms 18, it is possible to readily load bales that are lying in various positions in the path of the elevating-conveying apparatus, in its travel over the field, with little, if any, occasion for appreciably changing the direction of travel from other than a generally straight line along the row of bales.

While the apparatus has been described more particularly in connection with the loading of baled hay or the like, it will be apparent the apparatus and features thereof have desirable functional utility in other analogous operations. And it should be understood that the invention of the annexed claims is not limited to the exact details of design and construction described herein, for obvious modifications within the scope of the claims will be apparent to those skilled in the art.

We claim:

1. In combination with a wheeled structure having a pair of traction wheels mounted on an axle support, a conveyer comprising a basal body inclined downwardly toward its forward end and having its rear portion carried by and adjustably mounted above said axle support and its forward portion adjustably mounted for up and down movement on said wheeled structure forwardly of said axle support, an endless conveyer mounted on said basal body and having its upper course traveling rearwardly and upwardly, the forward end of said basal body being provided with forwardly extending and laterally inclined gathering arms having gathering fingers rockable inwardly toward each other against a normal bias, and driving means for connecting said endless conveyer to a power source.

2. In combination with a traveling support, an upwardly and rearwardly inclined, side-walled supporting structure having open ends and tiltably mounted toward its rear end upon said support, and an upwardly and rearwardly traveling conveying mechanism carried by said supporting structure and operative to convey material from the lower forward end of said supporting structure upwardly and rearwardly along said structure to the rear end thereof, the forward end portion of said supporting structure being provided with laterally spaced and forwardly projecting arms having adjacent their forward ends resiliently controlled gathering fingers rockable inwardly toward each other and operative to contact material gathered between said forwardly extending arms and to thereby assist in positioning and directing said material toward the forward end of said traveling conveying mechanism for reception and conveyance upwardly and rearwardly thereon.

3. In combination with a wheeled transportable support, an elevating-conveying apparatus for conveying baled material from the ground to an elevated rear discharge point and comprising an upwardly and rearwardly inclined, side-walled supporting structure having open ends and being tiltably mounted at a point toward its rear end on said wheeled support for tilting movement in a vertical plane to adjust the lower forward end of said supporting structure relative to the ground, an upwardly and rearwardly extending carrier belt mounted on said supporting structure and having transverse rows of outwardly extending points for holding engagement with baled material being transported rearwardly and upwardly by said carrier belt, spaced apart and forwardly directed gathering arms mounted at the forward end of said supporting structure and having forwardly directed elements rockably mounted on the forward portion of said side arms and biased to a forwardly directed position and operative to forcibly engage baled material on the ground and rockable inwardly toward each other from biased position, and means for adjustably and resiliently mounting said supporting structure on said wheeled support in position alongside thereof, said means comprising a pivoted link connection between said wheeled support and said supporting structure, and a swingable lever mounted on said supporting structure and operatively associated with said link connection and operative therethrough to effect desired vertical adjustment of the lower forward end of said supporting structure.

4. In combination, an open-ended, rearwardly and upwardly inclined, side-walled chute provided at its lower forward end with transversely spaced, substantially horizontally extending gathering arms having fingers yieldably mounted on and adjacent the forward ends of said spaced arms and biased to extend in a generally forward direction, said fingers being rockable inwardly against said normal bias, means for restraining said fingers against appreciable outward movement about their points of mounting on said arms, and an upwardly and rearwardly extending endless traveling conveyer mounted on said chute and operative to convey rearwardly and upwardly thereon objects received between said arms and delivered to said conveyer and to discharge said objects from the rear end thereof, said fingers being operative to forcibly engage material between said gathering arms and guide said material in desired direction toward the forward end of said traveling conveyer for reception thereon.

5. In combination with a traveling support, an upwardly and rearwardly inclined, side-walled supporting structure having open ends and mounted upon said support, and an upwardly and rearwardly traveling conveying mechanism carried by said supporting structure and operative to convey material from the lower forward end of said supporting structure upwardly and rearwardly along said structure to the rear end thereof, the forward end portion of said supporting structure being provided with laterally spaced and forwardly projecting arms, means operative to assist in positioning and directing material toward the forward end of said conveying mechanism comprising a gathering finger operatively mounted on the forward end portion of each arm and being yieldingly biased to contact material in the path of said supporting structure and to be swingable inward toward and rearward to a position wherein it is released by said material as said supporting structure continues to move forward and generally toward the material.

6. In combination with a wheeled transportable support, an elevating-conveying apparatus for conveying baled material from the ground to an elevated rear discharge point and comprising an upwardly and rearwardly inclined supporting structure having open ends and being adjustably mounted toward its rear end on said wheeled support for tilting movement in a vertical plane to adjust the lower forward end of said supporting structure relative to the ground, an upwardly and rearwardly extending endless carrier belt mounted on said supporting structure and having transverse arranged elements for holding baled material in position on said carrier belt, spaced apart and forwardly directed gathering arms mounted at the forward end of said supporting structure and having forwardly directed elements pivotally mounted thereon and operative to forcibly and yieldingly engage baled material on the ground and to thereby assist in positioning and guiding said baled material in desired position toward the forward end of said carrier belt for reception thereon and conveyance thereby, and means for adjustably supporting the forward portion of said supporting structure on said wheeled support in position alongside thereof, said means comprising a linked supporting connection between said wheeled support and said supporting structure, and an actuating element operative to cause raising of the forward end portion of said supporting structure through relative adjustment of portions of said linked supporting connection.

7. In combination with a wheeled support, an elevating-conveying apparatus for conveying material from the ground to an elevated point of discharge and comprising an open-ended, rearwardly and upwardly inclined chute provided at its lower forward end with transversely spaced, generally forwardly and outwardly extending gathering arms, and an upwardly and rearwardly extending endless traveling conveyer mounted on said chute and operative to convey rearwardly and upwardly thereon objects received between said arms and delivered to said conveyer and to discharge said objects from the rear end of said chute, said gathering arms being provided with material-directing elements yieldably mounted on and adjacent the forward ends of said spaced arms and extending in a generally forward direction, said material-directing elements being forcibly engageable with material in the path of said elements during the forward travel of said wheeled support and operative to guide and direct said material into desired position with respect to the forward end of said elevating-conveying mechanism.

8. In combination with a tractor having a rear axle support with a pair of traction wheels mounted thereon and a frame structure having a forward portion of reduced width extending forwardly from said axle support, a wheeled support for the forward portion of said frame, a conveyer comprising a basal supporting structure inclined downwardly toward its forward end and carried by and pivotally mounted above said axle support and disposed alongside the forward portion of said frame structure, means comprising an adjustable linked connection between a forward portion of said tractor frame and said basal supporting structure and serving to adjustably mount the latter on the forward portion of said tractor frame for up and down movement about said pivotal mounting of said basal supporting structure, an endless conveying mechanism mounted on said basal supporting structure and having its upper course traveling rearwardly and upwardly, the forward end of said basal body being provided with a loading device including forwardly extending and laterally and outwardly inclined gathering portions having forwardly directed yieldable material-engaging prongs for assisting in positioning and directing material on the ground onto the forward end of said endless conveying mechanism, and driving means for establishing a driving connection from a power source on said tractor to said endless conveying mechanism.

9. In combination with a tractor having a frame of reduced width at its forward portion and a laterally extending rear axle support carrying a pair of spaced traction wheels, an elevating-conveyer comprising a basal support mounted on said tractor and having at its forward end forwardly and outwardly directed gathering portions in position to gather material from the ground, an upwardly extending supporting standard detachably secured to said tractor frame adjacent said rear axle support, means for adjustably supporting the forward end of said basal support from said tractor frame at a point forwardly of said rear axle support, said means comprising a laterally extending arm carried by said tractor frame and disposed beneath said basal support, and a multiple linked connection between said arm and said basal support, and means for lifting the forward end portion of said basal support and maintaining it in elevated position, said means comprising an actuating device cooperative with a portion of said linked connection and having an actuating element operable from the operator's seat on said tractor.

10. In combination with a power driven wheeled supporting structure, an elevating-conveyer comprising a basal support mounted on and alongside a forward portion of said wheeled supporting structure and having at its forward end spaced, forwardly and outwardly directed gathering portions, each of said gathering portions having a material contacting finger movably mounted thereon adjacent the forward end of the gathering portion and yieldably movable inwardly toward each other in a substantially horizontal plane, means for pivotally and adjustably mounting said basal support on said wheeled supporting structure with said basal support extending downwardly and forwardly from its pivotal support to a point adjacent the ground, an upwardly and rearwardly traveling endless conveying device operatively mounted on said basal support, a driving element for said endless conveying device and carried by said basal support with its axis substantially coincident with the axis of pivotal mounting of said basal support, and a driving connection to a power source on said wheeled supporting structure to said rotatable driving element of said endless conveying device.

11. In a machine for picking up baled material from a ground surface including a portable frame, a longitudinally extended material-conveyor carried on said frame, means for directing said material, as said frame is advanced, to a position for delivery to said conveyor mechanism including a guide member projected forwardly from said conveyor adjacent a side thereof, a pivoted member, means pivotally supporting said pivoted member on the front end of said guide member for pivotal movement in a substantially horizontal plane, stop means for limiting the pivotal movement of said pivoted member in one direction at a position extended forwardly from said guide member, and yieldable means for moving said pivoted member in said one direction and for releasably holding said pivoted member in said position.

12. In a machine for picking up material from a ground surface including a portable frame, a longitudinally extended material-conveyor carried on said frame, means for directing material to said conveyor, as said frame is advanced along the ground, including a pair of arms arranged at opposite sides of said conveyor and projected forwardly of said frame, a pivoted prong adjacent the front end of each of said arms, means supporting said prongs for pivotal movement in a substantially horizontal plane, and means for normally yieldably holding said prongs in a position projected forwardly from a corresponding arm and permitting pivotal movement of said prongs inwardly toward each other.

13. In a portable machine for picking up material from a ground surface, an upwardly and rearwardly inclined endless conveyor, means for directing material on the ground to said conveyor as the machine is advanced along the ground, including a pair of arms arranged at opposite sides of the front end of said conveyor and projected forwardly therefrom adjacent the ground surface, a pivoted material engaging member at the front end of each of said arms, with said pivoted members being normally extended forwardly from said arms, and means for yieldably holding said members in their normal positions and permitting pivotal movement thereof inwardly toward each other.

14. The combination with a tractor having a front axle and a rear axle with traction wheels thereon, of a loading attachment comprising an upwardly and rearwardly inclined frame structure extended along one side of said tractor and between said one tractor side and one of said traction wheels, with the front end of said frame structure terminating forwardly of said front axle and the rear end thereof rearwardly of said rear axle, an upright frame on said rear axle, means carried by said upright frame and mounting a rear end portion of said inclined frame structure for pivotal movement about a fixed horizontal axis, means for adjustably supporting said front end of the frame structure on said tractor comprising a multiple linked connection carried by the tractor and including an actuating device having an element operable from the operator's seat on the tractor, an endless conveyor movably supported on said frame structure for movement longitudinally thereof, means at said front end of the frame structure for directing material on the ground to said conveyor as said tractor is advanced, and means connecting a power source on said tractor with a rotatable conveyor-driving element carried by said inclined frame structure with its axis of rotation coincident with said fixed horizontal axis.

15. In combination with a traveling support, an upwardly and rearwardly inclined, side-walled supporting structure having open ends and mounted upon said support, and an upwardly and rearwardly traveling conveying mechanism carried by said supporting structure and operative to convey material from the lower forward end of said supporting structure upwardly and rearwardly along said structure to the rear end thereof, means operative to assist in positioning and directing material toward the forward end of said conveying mechanism comprising a gathering finger carried by the forward end of said supporting structure and operatively mounted and yieldingly biased to normally extend forward in a position to contact material in the path of said supporting structure and to be swingable rearward in contact with said material toward the forward end of said conveying mechanism and to a position wherein it is released by said material as said supporting structure continues to move forward and generally toward the material.

16. In combination with a traveling support, an upwardly and rearwardly inclined, side-walled supporting structure having open ends and mounted upon said support, and an upwardly and rearwardly traveling conveying mechanism carried by said supporting structure and operative to convey material from the lower forward end of said supporting structure upwardly and rearwardly along said structure to the rear end thereof, the forward end portion of said supporting structure being provided with a forwardly projecting arm having adjacent its forward end a gathering finger operatively mounted and yieldingly biased to normally extend forward in a position to contact material in the path of said supporting structure and to be swingable rearward in contact with said material toward the forward end of said traveling conveying mechanism and to a position wherein it is released by said material as said supporting structure continues to move forward and generally toward the material.

17. In combination with a traveling support, an upwardly and rearwardly inclined, side-walled supporting structure having open ends and mounted upon said support, and an upwardly and rearwardly traveling conveying mechanism carried by said supporting structure and operative to convey material from the lower forward end of said supporting structure upwardly and rearwardly along said structure to the rear end thereof, the forward end portion of said supporting structure being provided with laterally spaced and forwardly projecting arms for receiving and directing material toward said conveying mechanism, a gathering finger operatively mounted on the forward end portion of at least one of said arms and yieldingly biased to normally extend forward in a position to contact material in the path of said supporting structure and to be swingable inward toward the other arm and rearward to a position wherein it is released by said material as said supporting structure continues to move forward and generally toward the material.

18. In combination with a tractor having a frame, an upwardly extending supporting standard detachably secured to said tractor frame adjacent the rear thereof, an elevating-conveyor comprising a basal support having a rear end portion mounted to pivot about a horizontal axis afforded by parts carried by said standard and having at its forward end forwardly and outwardly directed gathering portions in position to gather material from the ground, means adjustably supporting the forward end of said basal support from and alongside a forward portion of said tractor frame comprising a linked connection between said tractor frame and said basal support, means for lifting the forward end portion of said basal support and maintaining it in elevated position comprising an actuating device cooperating with a portion of said linked connection and having an actuating element operable from the operator's seat on said tractor, and means connecting a power source on said tractor with a rotatable conveyor driving element carried by said basal support with its axis of rotation substantially coincident with said horizontal axis.

19. In combination with a tractor having a frame of reduced width at its forward portion and a laterally extending rear axle support carrying a pair of spaced traction wheels, an upwardly extending supporting standard detachably secured to said tractor frame adjacent said rear axle support, an elevating-conveyor comprising a basal support having a rear end portion mounted to pivot about a fixed horizontal axis afforded by parts carried by said standard and having at its forward end forwardly and outwardly directed gathering portions in position for gathering material from the ground, means disposed in part beneath and adjustably supporting the forward end of said basal support from said tractor frame at a point forwardly of said rear axle support, said means comprising a linked connection between said tractor frame and said basal support, means for lifting the forward end portion of said basal support and maintaining it in elevated position, said means comprising an actuating device cooperative with a part of said linked connection and having an actuating element operable from the operator's seat on said tractor, and means connecting a power source on said tractor with a rotatable conveyor-driving element carried by said basal support with its axis of rotation substantially coincident with said fixed horizontal axis.

ERIC M. McELHINNEY.
JAMES A. PODHAJSKY.